(12) United States Patent
Nishida et al.

(10) Patent No.: US 8,553,295 B2
(45) Date of Patent: Oct. 8, 2013

(54) IMAGE READING APPARATUS

(75) Inventors: Tomofumi Nishida, Yokohama (JP);
Shinichi Yukiura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 343 days.

(21) Appl. No.: 12/962,516

(22) Filed: Dec. 7, 2010

(65) Prior Publication Data
US 2012/0092731 A1    Apr. 19, 2012

(30) Foreign Application Priority Data
Oct. 15, 2010   (JP) .................................. 2010-232625

(51) Int. Cl.
*H04N 1/04*   (2006.01)
(52) U.S. Cl.
USPC ............ 358/461; 358/474; 358/498; 358/471
(58) Field of Classification Search
USPC .................. 358/461, 474, 498, 471, 496, 475
See application file for complete search history.

(56) References Cited

U.S. PATENT DOCUMENTS 5,107,350 A * 4/1992 Omori ........................... 358/461
6,891,648 B2   5/2005 Inoue

FOREIGN PATENT DOCUMENTS

JP          05-319613 A     12/1993
JP          2002-152510 A   5/2002

* cited by examiner

*Primary Examiner* — Houshang Safaipour
(74) *Attorney, Agent, or Firm* — Canon USA Inc IP Division

(57) ABSTRACT

An image reading apparatus includes a conveyance unit configured to convey a sheet, a reading unit configured to read an image on the sheet conveyed by the conveyance unit, a calibration member including a white reference region for acquiring correction data for correcting image information acquired by reading the image on the sheet with the reading unit, and a driving unit configured to move the calibration member so as to locate the white reference region in a position where the reading unit can read the white reference region if the correction data is acquired, and to locate a region other than the white reference region in a position that faces the sheet to be conveyed and is not brought into contact with the sheet if the sheet is conveyed.

6 Claims, 6 Drawing Sheets

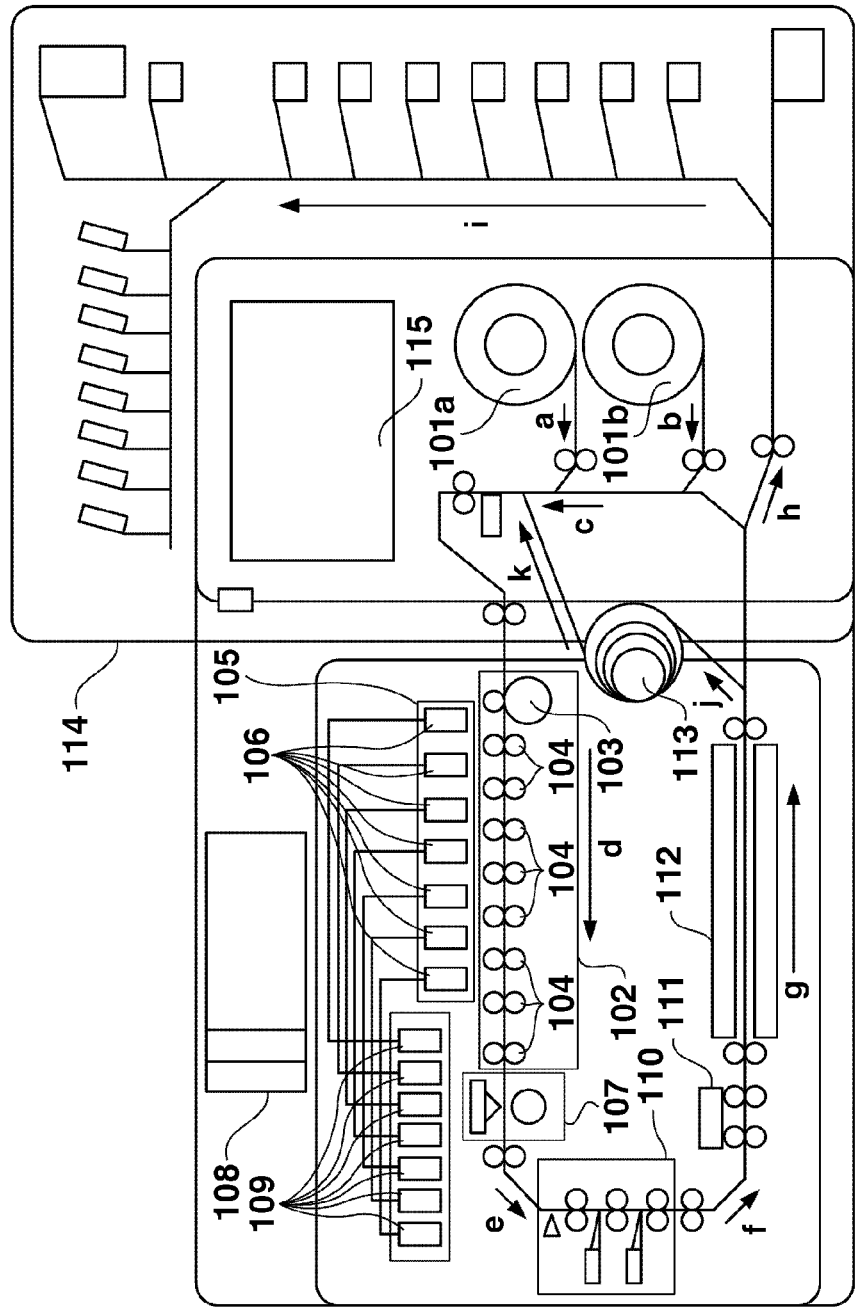

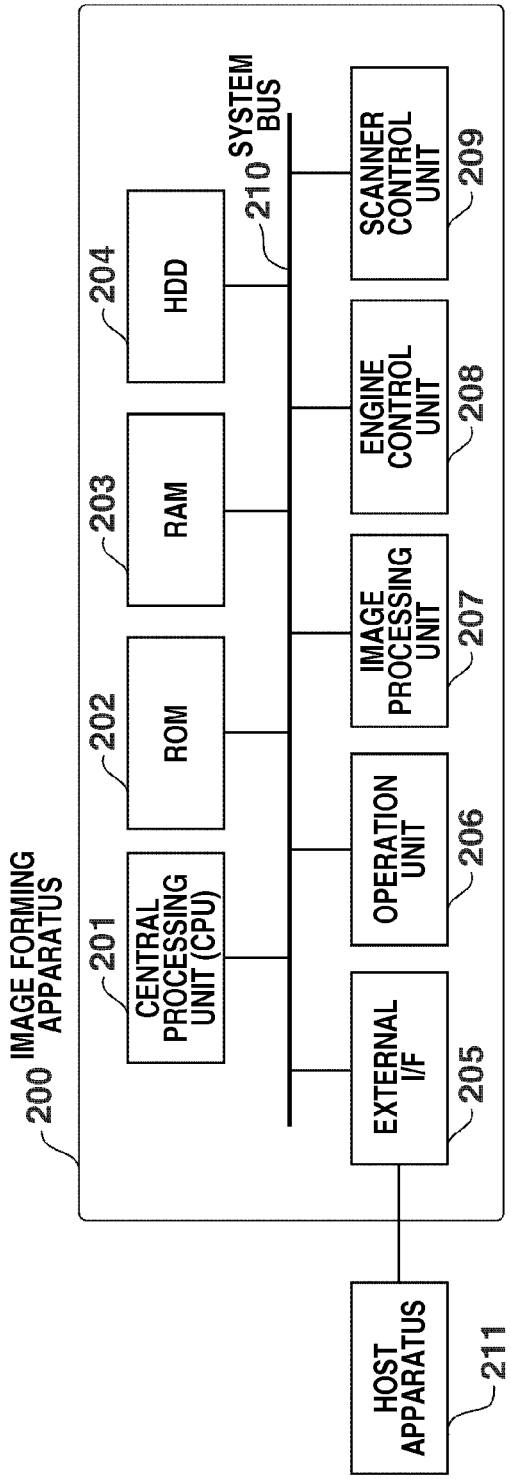

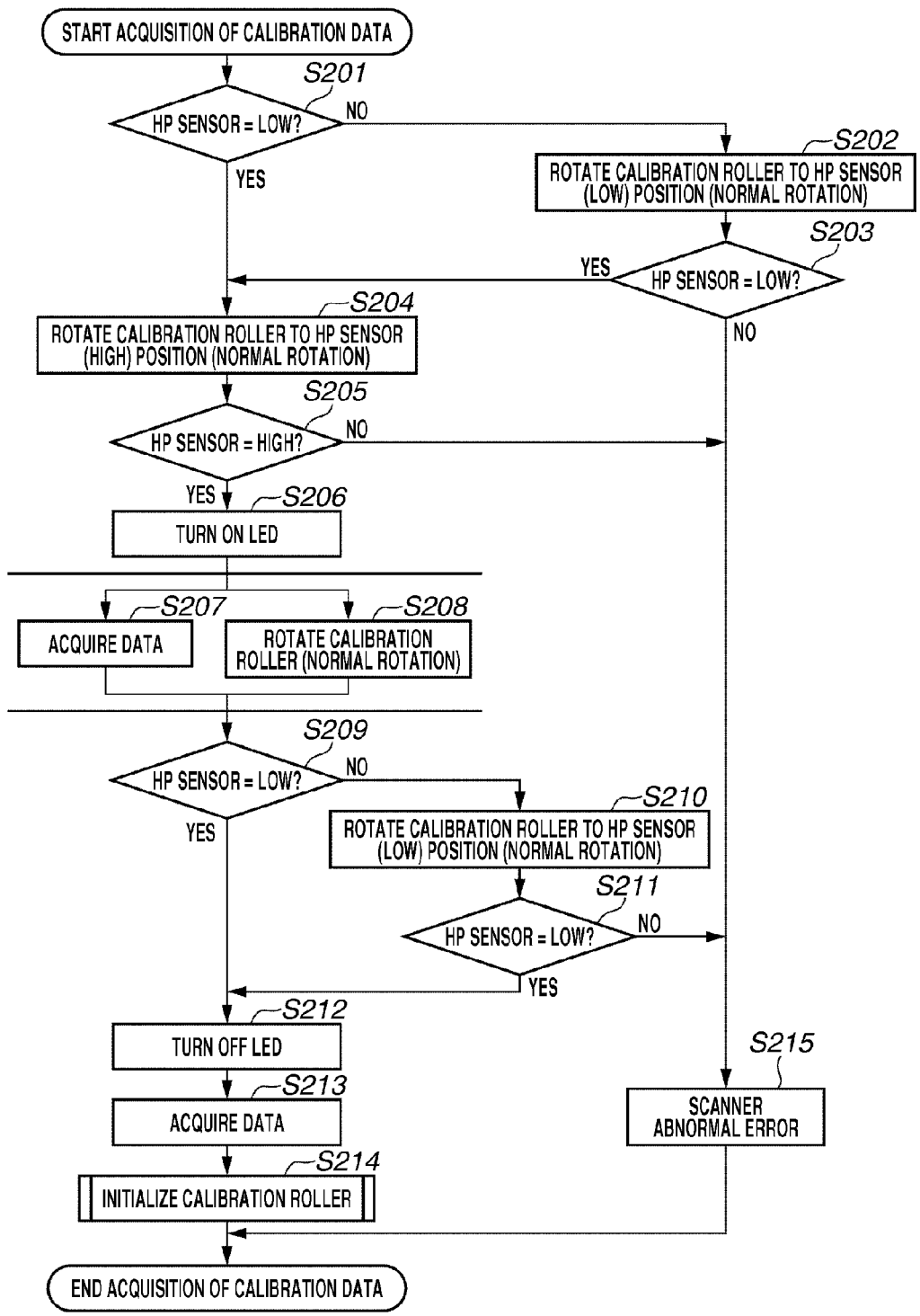

IMAGE READING APPARATUS

BACKGROUND OF THE INVENTION

1. Field of the Invention

The present invention relates to an image reading apparatus including a reading unit configured to read an image on a recording medium and a calibration member for acquiring calibration correction data.

2. Description of the Related Art

Conventionally, a sheet through type scanner that conveys a document to be read by a fixed reading unit reads a white reference region disposed on an opposite surface of the reading unit to acquire white calibration correction data. As this white reference region, a surface of a roller-shaped calibration roller may be used.

However, in a conventional unit configured to acquire the white calibration correction data, there is a problem that, if a stain is adhered to the white reference region on the calibration roller, a sufficient correction effect cannot be obtained using the white calibration correction data acquired from the stained white reference region. Particularly, in the sheet through type scanner which combines the calibration roller that has the white reference region and a roller for conveying a document, a stain may be adhered to the white reference region due to conveyance of the document.

In an image reading apparatus discussed in Japanese Patent Application Laid-Open No. 5-319613, a control technique is provided in which a groove is formed on a part of the periphery of a reading roller and a bottom of the groove serves as a white reference region for calibration correction, and the white reference region is not stained due to conveyance of a document.

In an image reading apparatus discussed in Japanese Patent Application Laid-Open No. 2002-152510, a following control method is provided. Specifically, a fixed range on a surface of a reading roller which serves as a white reference for white calibration correction is read by a charge coupled device (CCD) image sensor. The read image data is divided into m pieces of blocks for each L line to calculate an average value of image data on each line of each block. The average value of each block is compared with each other and a peak value among all average values is determined as white calibration data. Accordingly, even if a stain is adhered to a white reference region, a correction effect can be obtained.

However, the above described prior art has the following problems.

In Japanese Patent Application Laid-Open No. 5-319613, since the white reference region is the bottom region of the groove on the calibration roller, a distance between an image sensor and a document read by the reading unit is different from a distance between the image sensor and the bottom of the groove on the calibration roller which is the white reference region. Thus, in the reading unit provided with the image sensor shallow in a focal depth, there is a problem that the white reference region is out of an in-focus position and the sufficient correction effect cannot be obtained in the white calibration correction data to be read. Further, in order to align the white reference region with the in-focus position, there is a problem that a mechanism to travel the calibration roller to align the groove portion on the calibration roller with a document reading position is required.

In Japanese Patent Application Laid-Open No. 2002-152510, since a distance from the center of the calibration roller to a conveyance path of the document and a radius of the white reference region for reading the white reference data for calibration correction on the calibration roller are the same, distances are consistent. However, when the document is conveyed, there is a problem that the calibration roller may be brought into contact with the document.

SUMMARY OF THE INVENTION

The present invention is directed to a technique capable of reducing a stain on a white reference region due to contact between a calibration roller and a recording medium and obtaining a sufficient calibration correction effect.

According to an aspect of the present invention, an image reading apparatus includes a conveyance unit configured to convey a sheet, a reading unit configured to read an image on the sheet conveyed by the conveyance unit, a calibration member including a white reference region for acquiring correction data for correcting image information acquired by reading the image on the sheet with the reading unit, and a driving unit configured to move the calibration member so as to locate the white reference region in a position where the reading unit can read the white reference region if the correction data is acquired, and to locate a region other than the white reference region in a position that faces the sheet to be conveyed and is not brought into contact with the sheet if the sheet is conveyed.

According to the aspect of the present invention, a stain on a white reference region on a calibration member can be reduced and a sufficient calibration correction effect can be obtained.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 illustrates a schematic configuration of an image processing apparatus which is an example of a printing control apparatus according to an exemplary embodiment of the present invention.

FIG. 2 is a block diagram illustrating a configuration with respect to control in the image processing apparatus illustrated in FIG. 1 according to the exemplary embodiment of the present invention.

FIG. 6 is a flowchart illustrating a control procedure for controlling a calibration roller to acquire calibration correction data according to the exemplary embodiment of the present invention.

DESCRIPTION OF THE EMBODIMENTS

Figure 3A:
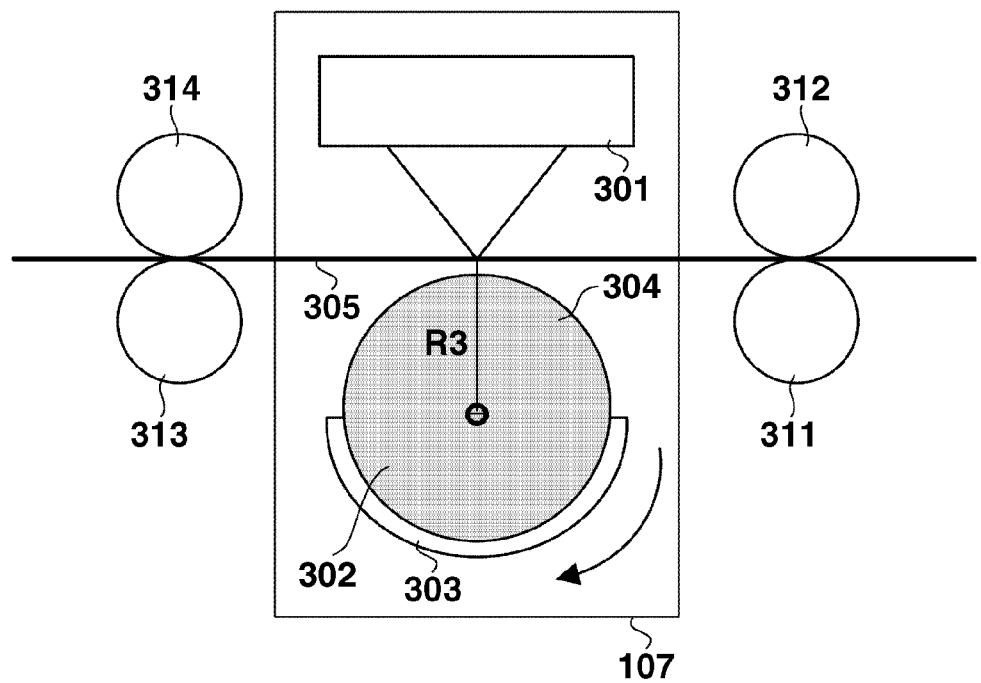
FIGS. 3A and 3B illustrate a position of a CCD image sensor, a sheet and a conveyance path thereof, and a position of a calibration roller that form a scanner unit in the image processing apparatus illustrated in FIG. 1 according to the exemplary embodiment of the present invention.

Various exemplary embodiments, features, and aspects of the invention will be described in detail below with reference to the drawings.

A relative arrangement and an apparatus shape of each component of an apparatus to be used in the exemplary embodiments of the present invention are merely example and the present invention is not limited to these exemplary embodiments.

FIG. 1 illustrates a schematic configuration of an example of an image processing apparatus according to an exemplary embodiment. The image processing apparatus illustrated in FIG. 1 includes a printing function and a reading apparatus that reads an image on a document. However, the image processing apparatus may be a multifunction peripheral to which other functions are added. As a recording material (a medium to be recorded or a recording sheet) to be used in printing processing, a roll sheet is described as an example. However, the recording medium is not limited to the rolled material, as long as it is a long continuous sheet on which a plurality of pages can be continuously printed on the same surface without cutting the sheet along the way. The image processing apparatus may automatically cut the continuous sheet or a user may manually instruct the image processing apparatus to cut the continuous sheet.

The material of the recording material is not limited to paper. If the material is available for printing, various types of materials can be used. The image processing apparatus may allow printing on not only a continuous sheet but also a cut sheet which is cut into a predetermined size in advance.

A printing method to print an image is not limited to an ink jet method using image printing liquid ink which will be described below. As a recording material, solid ink may also be used. Further, the printing method is not limited to color recording using recording materials of a plurality of colors. The printing method may be monochrome recording which uses only a black (includes grey) recording material.

Printing is not limited to printing of a visible image. The printing may include printing of an invisible image or a hardly visible image, and various types of printing other than a general image, such as printing of a wiring pattern, a physical pattern in manufacturing of parts, and a DNA base sequence. In other words, if a recording material can be provided on a recording material, the present invention can be applied to various types of image processing apparatuses. In addition, if an operation of printing processing in the image processing apparatus is controlled by instructions from an external apparatus connected to the image processing apparatus in FIG. 1, this external apparatus serves as a printing control apparatus.

FIG. 1 is a cross-sectional view illustrating an outline of the whole configuration of the image processing apparatus which uses a roll sheet (continuous sheet longer than a length in a unit of print (one page) in a conveyance direction) as a recording material. The image processing apparatus includes the following components 101 to 115. These components are disposed in one housing. However, these components may also be configured so as to be divided into a plurality of housings.

A control unit 108 incorporates a control section including a controller (e.g., a central processing unit (CPU) or a micro processing unit (MPU)), an output device of user interface information (e.g., a generation device of display information, sound information), and various input-output (I/O) interfaces. The control unit 108 manages various types of control of the whole image processing apparatus.

A roll sheet unit includes two sheet cassettes of an upper stage sheet cassette 101a and a lower stage sheet cassette 101b. A user inserts a roll sheet (hereinafter, referred to as a sheet) in a magazine and then loads the magazine on the image processing apparatus main body. A continuous sheet extracted from the upper stage sheet cassette 101a is conveyed in a direction shown an arrow "a" in FIG. 1, and a continuous sheet extracted from the lower stage sheet cassette 101b is conveyed in a direction shown an arrow "b" in FIG. 1 respectively. The continuous sheets from both the cassettes are also travelled in a direction shown an arrow "c" in FIG. 1 to reach a conveyance unit 102.

The conveyance unit 102 conveys the continuous sheet in a direction shown an arrow "d" (horizontal direction) in FIG. 1 via a plurality of rotation rollers 104 during the printing processing. When a sheet cassette as a sheet feed source is changed from one to another, the already extracted continuous sheet is rewound in the cassette and then a continuous sheet is newly fed from the other sheet cassette.

Above the conveyance unit 102, a recording head unit 105 is disposed facing to the conveyance unit 102. The recording head unit 105 is equipped with independent recording heads 106 for a plurality of colors (seven colors in the present exemplary embodiment) along a conveyance direction of the continuous sheet. In the present exemplary embodiment, the recording head unit 105 includes seven recording heads corresponding to seven colors of black (K), magenta (M), cyan (C), yellow (Y), grey (G), light magenta (LM), and light cyan (LC). Of course, another color may be used, and all of these colors also need not to be used.

The image processing apparatus of the present exemplary embodiment discharges ink from the recording heads 106 to form an image on the continuous sheet in synchronization with conveyance of the continuous sheet by the conveyance unit 102. Each of the recording heads 106 is disposed in a position where a discharge destination of ink does not overlap with the rotation roller 104. Instead of directly discharging ink on the continuous sheet, a printing method that provides ink on an intermediate transfer member and then applies the ink on the intermediate transfer member to the continuous sheet to form an image can be used. A printing unit is configured by including the conveyance unit 102, the recording head unit 105, and the recording heads 106.

Ink tanks 109 independently store ink of respective colors. Ink is supplied from the ink tank 109 to a sub tank mounted corresponding to each color via a tube, and further supplied from the sub tank to each recording head 106 via a tube. The recording heads 106 including a line head of respective colors (seven colors in the present exemplary embodiment) are lined up along a conveyance direction during printing shown an arrow "d".

The line head of each color may be formed by a seamless single nozzle chip or may be formed by divided nozzle chips regularly lined up in one array or a in a staggered array. In the present exemplary embodiment, a "full multi head" is adopted in which nozzles are lined up in a range of covering a width of a printing area on the continuous sheet having the maximum size which can be used by the image processing apparatus.

As an ink jet method for discharging ink from a nozzle, methods using a heat element, a piezoelectric element, an electrostatic element, a microelectromechanical (MEMS) element, and the like can be employed. Ink is discharged from the nozzle on each head based on print data. However, timing of discharge the ink is determined by an output signal from a conveyance encoder 103. The present exemplary embodiment is not limited to a printer employing the ink jet method using ink as a recording material. The present exemplary embodiment can be applied to printers employing various printing methods, such as a thermal printer (sublimation type, thermal transfer type, etc.) and a dot impact printer.

After an image is formed on the continuous sheet, the continuous sheet is conveyed from the conveyance unit 102 to a scanner unit 107. The scanner unit 107 optically reads the printed image and a special pattern on the continuous sheet to confirm whether the printed image includes a defect.

The continuous sheet is conveyed from the vicinity of the scanner unit 107 to a direction shown by an arrow "e" and introduced into a cutter unit 110. The cutter unit 110 cuts the continuous sheet for each length in a predetermined unit of print. The length in the predetermined unit of print is different corresponding to an image size to be printed. For example, in an L-size photograph, a length in the conveyance direction is 135 mm, and in an A4-size sheet, a length in the conveyance direction is 297 mm.

In a case of single-sided printing, the cutter unit 110 cuts the continuous sheet in a unit of page. However, depending on contents of a print job, the cutter unit 110 may not cut the sheet in a unit of page. Further, in the case of double-sided printing, the cutter unit 110 does not cut the continuous sheet in a page unit to continuously print an image on a first surface (e.g., front surface) of the continuous sheet for a predetermined length and cuts the sheet in a unit of page when a second surface (e.g., rear surface) is printed.

The cutter unit 110 is not limited to the one which cuts for each one image in the single-sided printing or the back side printing of the double-sided printing. The cutter unit 110 may not cut the sheet until the predetermined length is conveyed and cut the sheet after the predetermined length is conveyed. Then, another cutter device may manually cut off the sheet for each one (one page) image. When cutting is required to a width direction of the continuous sheet, another cutter device is used.

The sheet (cut sheet or continuous sheet) conveyed from the cutter unit 110 is conveyed in a direction shown by an arrow "f" in FIG. 1 in the unit and conveyed to a back side printing unit 111. The back side printing unit 111 is a unit configured to print predetermined information on the rear surface of the sheet when an image is printed only on the single surface of the sheet.

The information to be printed on the rear surface of the sheet includes information such as a character, a symbol, and a code (e.g., number for order management) corresponding to each printed image. When the recording heads 106 print an image for a print job of double-sided printing, the back side printing unit 111 prints the above described information other than the area on which the recording heads 106 print the image. The back side printing unit 111 can adopt a method such as impression of a recording material, thermal transfer, and ink jet.

The continuous sheet or the cut sheet passing through the back side printing unit 111 is next conveyed to a drying unit 112. The drying unit 112 is a unit configured to heat a sheet which passes through the unit in a direction shown by an arrow "g" in FIG. 1 with hot air (heated gas (air)) in order to dry the sheet provided with ink in a short time. Instead of using hot air, various drying methods such as using cold air, heating by a heater, naturally drying only by a wait, and irradiation with an electromagnetic wave such as ultraviolet light can be adopted.

The cut sheet cut to a length in a unit of print passes through the drying unit 112 one by one, is conveyed in a direction shown by an arrow "h" in FIG. 1, and is conveyed to a sorting unit 114. The sorting unit 114 includes a plurality of trays (18 trays in the present exemplary embodiment) and distinguishes trays as a discharge destination of the sheet according to a length in a unit of print or the like. A tray number is allocated to each tray. The sorting unit 114 discharges the sheet which passes through the unit in a direction shown by an arrow "j" in FIG. 1 to the tray corresponding to the tray number set for each printed image while confirming whether the tray is vacant or full with loaded sheets by a sensor mounted on each tray.

As a tray serving as the discharge destination of the cut sheet, a print job issuing source (a host apparatus) may designate a specific tray, and the image processing apparatus may arbitrarily designate a vacant tray. A predetermined number of sheets can be discharged to one tray. If a number of sheets to be output by a print job exceeds the predetermined number of sheets, sheets will be discharged over a plurality of trays. A number, a size, and a type of sheets to be discharged to a tray vary according to a size (type) of the tray or the like.

In FIG. 1, trays (hereinafter, referred to as large trays) which are vertically arranged (up and down) can be used for discharge of a large size sheet (A4-size sheet, sheet larger than L-size) and a small size sheet (L-size). Further, trays (hereinafter, referred to as small trays) which are horizontally (right and left) arranged can be used for discharge of a small size sheet (L-size) but cannot be used for discharge of a large size sheet. Then, the large tray can accept a larger output number of sheets to be discharged there on than that of the small tray.

A state of the image processing apparatus, such as sheet discharge is in progress and sheet discharge is completed, is provided to a user in a distinguishable way using a display device (e.g., a light emitting diode (LED) or the like is used). For example, a plurality of LEDs which emit light in different colors may be provided on each tray, so that the user can be notified of various states of each tray according to the color of the lighted LED, and whether the LED is lighted or flashing. Each of a plurality of trays can be assigned an order of priority. Thus, when a print job is executed, an image processing apparatus 200 allocates a vacant tray (no sheet is discharged) as a discharge destination according to the order of priority.

In a default setting, the upper the tray is located, the higher the order of priority becomes in the large trays. In the small trays, the closer to the left side the tray is located, the higher the order of priority becomes. Further, the small tray is higher in the order of priority than the large tray. In the order of priority, a user may give a higher priority to a position where a sheet is easily extracted. However, the order of priority can suitably be changed by a user operation.

A sheet winding unit 113 winds the continuous sheet whose front surface is subjected to printing without being cut for each page. In the double-sided printing, the continuous sheet on which image formation is performed on its front surface is not cut in a unit of page by the cutter unit 110 and is cut as a continuous sheet on which printing is continuously performed in a plurality of units of pages on its front surface. The continuous sheet printed on the front surface thereof passes through the unit in a direction shown by the arrow "j" in FIG. 1 and is wound by the sheet winding unit 113.

Then, the continuous sheet which is wound after image formation for a series of pages on the front surface is completed is again conveyed in a direction shown by an arrow "k" in FIG. 1 in the unit with a surface opposite to the previous front surface being a printable surface. In other words, a surface of the sheet facing to the recording heads 106 is reversed and conveyed. By conveying the sheet like this, an image is printed on the rear surface opposite to the previous front surface.

In the case of normal single-sided printing, the continuous sheet on which an image is printed is cut in a unit of pages and is conveyed to the sorting unit 114 without being wound by the sheet winding unit 113.

As described above, in the case of double-sided printing, the continuous sheet is wound using the sheet winding unit 113 and is reversed to be printed on the rear surface. Thus, the surface of the sheet to be discharged onto the sorting unit 114 is different between in single-sided printing and in double-sided printing.

More particularly, in the case of single-sided printing, since the sheet is not reversed using the sheet winding unit 113, the sheet on which an image of a head page is printed is discharged with the image of the head page facing downward. When one print job includes a plurality of pages, sheets are sequentially discharged to a tray from a sheet of the head page to subsequent pages and stacked one after another. Such the sheet discharge is referred to as face down sheet discharge.

On the other hand, in the case of double-sided printing, since the sheet is reversed using the sheet winding unit 113, the sheet on which the image of the head page is printed is discharged with the image of the head page facing upward. When one print job includes a plurality of sheets to be output, sheets are discharged to a tray from a sheet of the last page in descending order of page number and stacked one after another. Thus, the sheet on which the image of the head page is printed is discharged last. Such the sheet discharge is referred to as face up sheet discharge.

An operation unit 115 is a unit on which a user performs various operations. The operation unit 115 can notify a user of various types of information. For example, the operation unit 115 enables a user to confirm a printing condition for each order, such as a sheet on which an image designated by a user is printed is loaded on which tray, or the image is in process of printing or is completed with printing. The operation unit 115 enables a user to confirm various states of the apparatus such as an ink remaining amount and a sheet remaining amount. Further, the operation unit 115 enables a user to perform operation and confirmation for instructing execution of maintenance of the apparatus such as head cleaning.

FIG. 2 is a block diagram illustrating a configuration related to control in the image processing apparatus illustrated in FIG. 1 according to the present exemplary embodiment. The image processing apparatus 200 is the image processing apparatus illustrated in FIG. 1.

The control unit 108 mainly includes a CPU 201, a read only memory (ROM) 202, a random access memory (RAM) 203, an image processing unit 207, an engine control unit 208, and a scanner control unit 209. A hard disk drive (HDD) 204, an operation unit 206, an external interface (I/F) 205, are connected to the control unit 108 via a system bus 210.

The CPU 201 is a central processing unit in the form of a microprocessor (microcomputer). The CPU 201 is included in the control unit 108 illustrated in FIG. 1. The CPU 201 controls operations of the whole image processing apparatus 200 by executing a program and starting up hardware. The ROM 202 stores a program executed by the CPU 201 and fixed data necessary to various operations on the image processing apparatus 200. The RAM 203 is used as a work area on the CPU 201 and a temporary storage area of various pieces of received data, and stores various pieces of setting data. The HDD 204 can store and read a program to be executed by the CPU 201, print data, and setting information necessary to various operations on the image processing apparatus 200 in and from a built-in hard disk. Instead of the HDD 204, another large capacity image processing apparatus may also be employed.

The operation unit 206 includes a hard key and a touch panel to allow a user to perform various operations, and a display unit configured to provide (notify) a user with various types of information. The operation unit 206 corresponds to the operation unit 115 in FIG. 1. Further, information can also be provided to a user by outputting a sound (buzzer, voice, etc.) based on sound information from a sound generation device.

The image processing unit 207 executes rasterization (conversion) of print data (e.g., data described by page description language) which is handled by the image processing apparatus 200 to image data (a bit map image) and image processing. The image processing unit 207 converts a color space (e.g., YCbCr color space) of the image data included in input print data into a standard RGB color space (e.g., sRGB color space). Further, the image processing unit 207 executes various types of image processing such as resolution conversion into an effective pixel number (that the image processing apparatus 200 can print), image analysis, and image correction to the image data. The image data obtained by these image processing is stored in the RAM 203 or the HDD 204.

The engine control unit 208 controls processing to print an image based on print data on a sheet according to a control command received from the CPU 201 or the like. The engine control unit 208 issues an instruction to discharge ink to the recording heads 106 of respective colors, sets discharge timing to adjust a dot position (an impact position of ink) on a recording medium, and perform adjustment based on acquisition of a head driving state. The engine control unit 208 controls driving of the recording head according to the print data, discharges ink from the recording head to form an image on a sheet. Further, the engine control unit 208 issues an instruction to drive a sheet feed roller and an instruction to drive a conveyance roller, and performs control of the conveyance roller so as to acquire a rotation condition of the conveyance roller to convey and stop the sheet at a suitable speed and via a suitable path.

The scanner control unit 209 controls an image sensor according to a control command received from the CPU 201 or the like, reads an image on the sheet, acquires analog luminance data of red (R), green (G), and blue (B), and converts the acquired analog luminance data into digital data. As the image sensor, a charge coupled device (CCD) image sensor, a complementary metal-oxide semiconductor (CMOS) image sensor, and the like can be employed. Further, the image sensor may also be a linear image sensor or an area image sensor.

The scanner control unit 209 issues an instruction to drive the image sensor, acquires a condition of the image sensor based on the driving, analyzes luminance data acquired from the image sensor, and detects a defect in ink discharge from the recording head 106 and a cutting position of a sheet. If the sheet determined that an image is correctly printed thereon by the scanner control unit 209 is subjected to drying processing of ink on the sheet and then discharged to a tray on the designated sorting unit.

A host apparatus 211 corresponding to the above described external apparatus is connected to the outside of the image processing apparatus 200, and serves as a supply source of image data be printed by the image processing apparatus 200. The host apparatus 211 issues an order of various print jobs. The host apparatus 211 may also be realized as a general-purpose personal computer (PC) or a data supply apparatus of another type.

The data supply apparatus of another type includes an image capture apparatus that captures an image to generate image data. The image capture apparatus includes a reader (scanner) that reads an image on a document to generate image data, a film scanner that reads a negative film and a positive film to generate image data, and the like. Further, other examples of the image capture apparatus includes a digital camera that captures a still image to generate digital image data and a digital video that captures a moving image to generate moving image data.

In addition to this, the host apparatus 211 may include a photo storage installed on a network or a socket for inserting an attachable and detachable portable memory to read an image file stored in the photo storage or the portable memory, and generate image data to be printed. Further, instead of a general-purpose PC, the host apparatus 211 may be various types of data supply apparatuses such as a terminal exclusive to the image processing apparatus according to the present exemplary embodiment. These data supply apparatuses may be provided as the components of the image processing apparatus or may be provided as other apparatuses connected to the outside of the image processing apparatus.

When the host apparatus 211 is a PC, an operating system, application software for generating image data, and a printer driver for the image processing apparatus 200 are installed on the image processing apparatus on the PC. The printer driver controls the image processing apparatus 200, converts image data to be supplied from the application software into a format to be handled by the image processing apparatus 200, and generates print data. Conversion from the print data into the image data may be executed on the host apparatus 211 side to supply the image data to the image processing apparatus 200. It is not essential to realize all of the above described processing by software. A part or all of the processing may be realized by hardware.

Image data, other commands, and a status signal to be supplied from the host apparatus 211 can be transmitted to and received from the image processing apparatus 200 via the external I/F 205. The external I/F 205 may be a local I/F or a network I/F. Further, the external I/F 205 may be connected by wire or may wirelessly be connected.

Each configuration described above in the image processing apparatus 200 is connected via the system bus 210 and can be communicated with each other.

In the example described above, one CPU 201 has controlled all components in the image processing apparatus 200 illustrated in FIG. 2. However, a configuration other than this configuration may be adopted. More particularly, some of functional blocks may separately include CPUs to individually perform control using the respective CPUs. Further, each functional block can employ various forms so as to be properly divided as an individual processing unit or a control unit or integrated with some of them according to a method for sharing the functions in addition to the configuration illustrated in FIG. 2. A direct memory access controller (DMAC) can be used to read data from a memory.

Figure 3B:
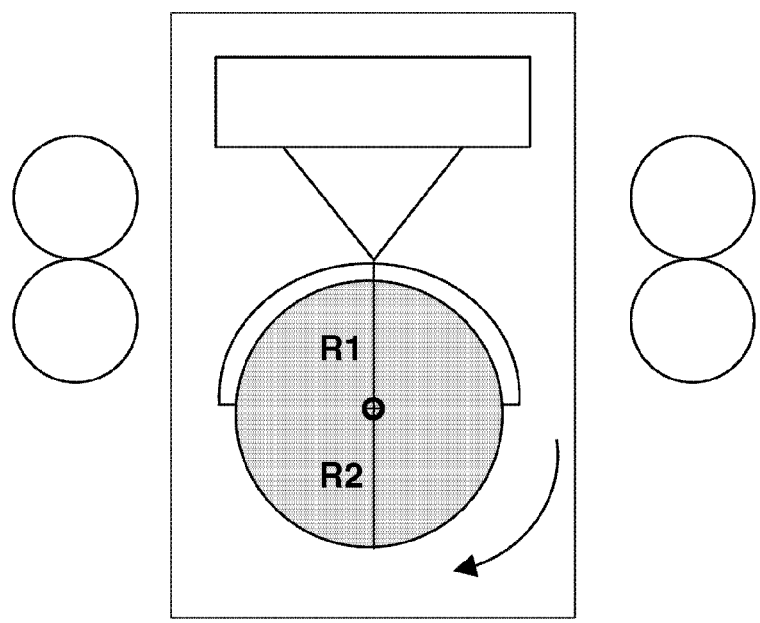

FIGS. 3A and 3B illustrate an image reading apparatus. The scanner unit 107 includes a CCD image sensor 301, a sheet conveyance path, and a calibration roller 302 which is a calibration member.

The scanner unit 107 is disposed on the downstream side in a conveyance direction of a continuous sheet 305 with respect to the recording head unit 105. The scanner control unit 209 controls the CCD image sensor 301, reads an image recorded on the continuous sheet 305, and acquires image information. In the present exemplary embodiment, the CCD image sensor 301 is employed. However, a CMOS image sensor or the like can be employed.

The calibration roller 302 rotatably supported is a roller for acquiring a white reference on the scanner unit 107. A white reference region 303 is formed on a part of an outer circumference surface of the roller. A region 304 other than the white reference region 303 may be referred to as a black reference region 304 in which the outer circumference surface of the roller member formed out of a black resin is exposed. When the black reference region 304 is read by the scanner unit 107, a luminance value becomes low. The region 304 other than the white reference region on the calibration roller 302 may be formed of a material other than the black resin. The whole surface of the roller may be formed of a white member.

Further, in the present exemplary embodiment, the calibration member is described as the calibration roller 302. However, the calibration member may be a roller shape or another shape.

The scanner unit 107 causes the scanner control unit 209 to control the CCD image sensor 301 and reads the white reference for calibration correction data in the white reference region 303 on the calibration roller 302.

Conveyance rollers 311 and 313 receive driving from the driving source and rotate in counterclockwise direction in FIG. 3 to convey the continuous sheet 305. Pinch rollers 312 and 314 press the continuous sheet 305 toward the conveyance rollers 311 and 313. When conveying, the continuous sheet 305 receives tension in the conveyance direction and passes through a predetermined conveyance path between the conveyance roller 311 and the conveyance roller 313. When the continuous sheet 305 passes through the predetermined conveyance path, a recording surface of the continuous sheet 305 is located in an in-focus position of the CCD image sensor 301.

A distance R3 from the rotation center of the calibration roller 302 to the conveyance path of the continuous sheet 305 and a radius R1 of the white reference region 303 on the calibration roller 302 are the same distance (it means the same length within the margin of error on manufacturing). More specifically, it is desirable that the distance R1 from the rotation center of the calibration roller 302 to the white reference region 303 is equal to a distance from the rotation center of the calibration roller 302 to a recording surface (upper surface) on the continuous sheet 305 which is conveyed through the conveyance path.

Thus, the distance from the CCD image sensor 301 to the continuous sheet 305 is the same as the distance from the CCD image sensor 301 to the white reference region 303 on the calibration roller 302 (also include when they are not the same within the margin of error on manufacturing). Accordingly, both can be located in the in-focus position.

A relationship between a radius R2 of the region 304 other than the white reference region on the calibration roller 302 and the radius R1 of the white reference region 303 on the calibration roller 302 is given by R2<R1. Further, a relationship between the radius R2 of the region 304 other than the white reference region on the calibration roller 302 and the distance R3 from the center of the calibration roller 302 to the conveyance path of the continuous sheet 305 is given by R2<R3. As illustrated in FIG. 3A, by satisfying these relationships, when the calibration roller 302 is stopped in a phase in which the region 304 other than the white reference region faces the continuous sheet 305, the continuous sheet 305 in process of conveyance is not in contact with the calibration roller 302.

The calibration roller 302 can rotate by driving of a motor. An arrow in FIGS. 3A and 3B indicates a rotation direction of the calibration roller 302.

By rotating the calibration roller 302, the region of the calibration roller 302 facing the CCD image sensor 301 can be changed. In the present exemplary embodiment, the motor that rotates the calibration roller 302 is described as a stepping motor 403. However, the motor may be configured by a direct current (DC) motor or the like.

Figure 4:
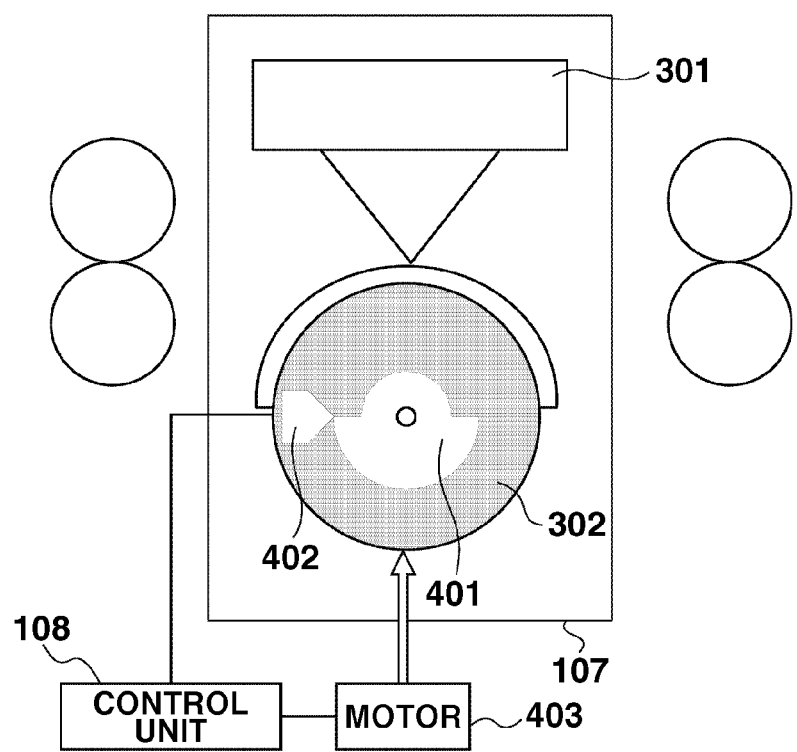
FIG. 4 illustrates a position of a calibration roller and a position of a home position (HP) sensor that form the scanner unit illustrated in FIG. 1 according to the exemplary embodiment of the present invention.

FIG. 4 illustrates a position of the calibration roller 302 and a position of home position (HP) sensor 402 that configure the scanner unit illustrated in FIG. 1 according to the present exemplary embodiment. A motor 403 rotates the calibration roller 302. The control unit 108 controls the motor 403. A home position detection signal from the HP sensor 402 is transmitted to a control unit 108.

The HP sensor 402 which is configured by a photo interrupter detects which of the white reference region 303 and the region 304 other than the white reference region on the calibration roller 302 faces the CCD image sensor 301. As the HP sensor 402, not only the photo interrupter but also other position detection sensors can be employed.

When an input signal to the HP sensor 402 is not intercepted by a member 401 disposed on the concentric circle with the calibration roller 302, the input signal to the HP sensor 402 becomes HIGH. When the input signal to the HP sensor 402 is HIGH, it is in a state in which the white reference region 303 on the calibration roller 302 faces the CCD image sensor 301.

When the input signal to the HP sensor 402 is intercepted by the member 401, the input signal to the HP sensor 402 becomes LOW. When the input signal to the HP sensor 402 is LOW, it is in a state in which the region 304 other than the white reference region on the calibration roller 302 faces the CCD image sensor 301.

Figure 5:
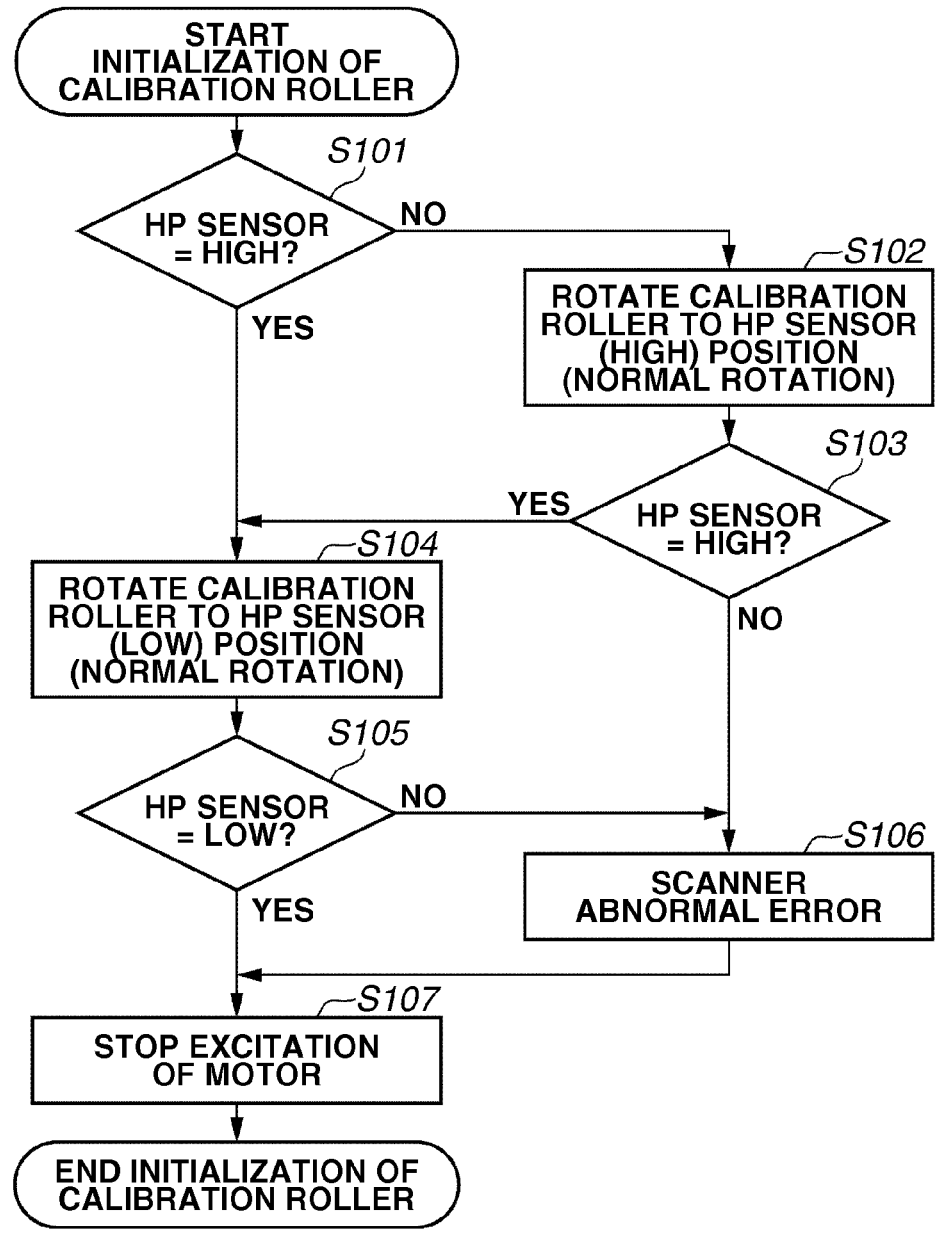
FIG. 5 is a flowchart illustrating a control procedure of a calibration roller according to the exemplary embodiment of the present invention.

FIG. 5 is a flowchart illustrating a control procedure of the calibration roller according to the present exemplary embodiment.

The control procedure of the calibration roller illustrated in the flowchart in FIG. 5 may be started at timing when the power source of the scanner unit on the image processing apparatus is turned on or before the power source of the scanner unit on the image processing apparatus is turned off. Further, it may be started after calibration correction data for correcting an image is acquired, which will be described below, or before the sheet is conveyed to read an image recorded on the sheet.

In step S101, the input signal to the HP sensor 402 is detected to determine whether the input signal is HIGH.

If the input signal is HIGH (YES in step S101), it indicates the state in which the white reference region on the calibration roller faces the CCD image sensor. Then, the processing proceeds to step S104.

If the input signal is LOW (NO in step S101), it indicates the state in which the region other than the white reference region on the calibration roller faces the CCD image sensor. Then, the processing proceeds to step S102.

In step S102, the stepping motor 403 is driven to rotate the calibration roller to a position where the input signal to the HP sensor 402 becomes HIGH. At this time, the stepping motor 403 may be driven while detecting the input signal to the HP sensor 402 or the stepping motor 403 may be driven only by a fixed distance to rotate the calibration roller without detecting the input signal.

In step S103, the input signal to the HP sensor 402 is detected to determine whether the input signal is HIGH.

If the input signal is HIGH (YES in step S103), it indicates that the calibration roller is changed into the state in which the white reference region on the calibration roller faces the CCD image sensor. Then, the processing proceeds to step S104.

If the input signal is LOW (NO in step S103), it indicates that the calibration roller is not changed from the state in which the region other than the white reference region on the calibration roller faces the CCD image sensor and even if the stepping motor 403 is driven, the calibration roller does not rotate. Thus, the processing proceeds to step S106.

In step S104, the stepping motor 403 is driven to rotate the calibration roller to a position where the input signal to the HP sensor 402 becomes LOW. At this time, the stepping motor 403 may be driven while detecting the input signal to the HP sensor 402 or the stepping motor 403 may be driven only by a fixed distance to rotate the calibration roller without detecting the input signal.

In step S105, the input signal to the HP sensor 402 is detected to determine whether the input signal is LOW.

If the input signal is LOW (YES in step S105), it indicates that the calibration roller is changed into the state in which the region other than the white reference region faces the CCD image sensor. Then, the processing proceeds to step S107.

If the input signal is HIGH (NO in step S105), it indicates that the calibration roller is not changed from the state in which the white reference region faces the CCD image sensor and even if the stepping motor 403 is driven, the calibration roller does not rotate. Thus, the processing proceeds to step S106.

In step S106, it is understood that a problem such as a breakdown of the stepping motor 403 and a signal detection defect of the HP sensor 402 occurs, and even if the stepping motor 403 is driven, the calibration roller cannot be rotated. Thus, the image processing apparatus is notified that the scanner unit is in an abnormal state.

In step S107, excitation of the stepping motor 403 is cut to put the stepping motor 403 into a state not to be driven and the position of the calibration roller is secured.

When the control procedure of the calibration roller illustrated in the flowchart in FIG. 5 is completed, the calibration roller is in the state in which the region other than the white reference region faces the CCD image sensor. Thus, when the sheet is conveyed and an image recorded on the sheet is read, the sheet can avoid contacting the calibration roller.

FIG. 6 is a flowchart illustrating a control procedure for controlling the calibration roller to acquire calibration correction data according to the present exemplary embodiment.

The control procedure for acquiring calibration correction data illustrated in the flowchart in FIG. 6 may be started at timing when the power source of the scanner unit on the image processing apparatus is turned on or before the sheet is conveyed to read the image recorded on the sheet.

In step S201, the input signal to the HP sensor 402 is detected to determine whether the input signal is LOW.

If the input signal is LOW (YES in step S201), it indicates the state in which the region other than the white reference region on the calibration roller faces the CCD image sensor. Then, the processing proceeds to step S204.

If the input signal is HIGH (NO in step S201), it indicates the state in which the white reference region on the calibration roller faces the CCD image sensor. Then, the processing proceeds to step S202.

In step S202, the stepping motor 403 is driven to rotate the calibration roller to a position where the input signal to the HP sensor 402 becomes LOW.

In step S203, the input signal to the HP sensor 402 is detected to determine whether the input signal is LOW.

If the input signal is LOW (YES in step S203), it indicates that the calibration roller is changed into the state in which the region other than the white reference region on the calibration roller faces the CCD image sensor. Then, the processing proceeds to step S204.

If the input signal is HIGH (NO in step S203), it indicates that the calibration roller is not changed from the state in which the white reference region on the calibration roller faces the CCD image sensor and even if the stepping motor 403 is driven, the calibration roller does not rotate. Then, the processing proceeds to step S215.

In step S204, the stepping motor 403 is driven to rotate the calibration roller to a position where the input signal to the HP sensor 402 becomes HIGH.

In step S205, the input signal to the HP sensor 402 is detected to determine whether the input signal is HIGH.

If the input signal is HIGH (YES in step S205), it indicates that the calibration roller is changed into the state in which the white reference region on the calibration roller faces the CCD image sensor. Then, the processing proceeds to step S206.

If the input signal is LOW (NO in step S205), the calibration roller is not changed from the state in which the region other than the white reference region on the calibration roller faces the CCD image sensor. This indicates that even if the stepping motor 403 is driven, the calibration roller does not rotate. Then, the processing proceeds to step S215.

In step S206, as a preparation for reading the white reference region on the calibration by the CCD image sensor, a light source is turned on. In the present exemplary embodiment, an LED light source is described as the light source. However, the light source such as a cold cathode fluorescent lamp (CCFL) may also be used.

In lighting processing of the LED light source in step S206, there is fixed waiting time is provided after the LED light source is turned on until a light quantity is stabilized. Further, in order to adjust the light quantity which enters the CCD image sensor from the LED light source based on a threshold value, an analog gain value is calculated.

In step S207, white reference data for calibration correction data is acquired.

In step S208, the stepping motor 403 is driven to rotate the calibration roller.

When the white reference data for the calibration correction data is acquired, the white reference region on the calibration roller faces the CCD image sensor to read the white reference region by a fixed line number while rotating the calibration roller. Accordingly, processing in steps S207 and S208 is executed in parallel.

The white reference region is read by the fixed line number while rotating the calibration roller. Thus, it is possible to reduce an influence of density dispersion in the white reference region on the calibration roller.

The white reference data pieces for the read fixed line number are averaged to execute image correction on image data generated by reading the image recorded on the sheet using the averaged data as white calibration correction data.

In step S209, the input signal to the HP sensor 402 is detected to determine whether the input signal is LOW.

If the input signal is LOW (YES in step S209), it is in the state in which the region other than the white reference region on the calibration roller faces the CCD image sensor. Then, the processing proceeds to step S212.

If the input signal is HIGH (NO in step S209), it is in the state in which the white reference region on the calibration roller faces the CCD image sensor. Then, the processing proceeds to step S210.

In step S210, the stepping motor 403 is driven to rotate the calibration roller to a position where the input signal to the HP sensor 402 becomes LOW.

In step S211, the input signal to the HP sensor 402 is detected to determine whether the input signal is LOW.

If the input signal is LOW (YES in step S211), it indicates that the calibration roller is changed into the state in which the region other than the white reference region on the calibration roller faces the CCD image sensor. Then, the processing proceeds to step S212.

If the input signal is HIGH (NO in step S211), it indicates that the calibration roller is not changed from the state in which the white reference region on the calibration roller faces the CCD image sensor and even if the stepping motor 403 is driven, the calibration roller does not rotate. Then, the processing proceeds to step S215.

In step S212, in order to read the black reference region, that is the region other than the white reference region on the calibration roller, the light source is turned off.

In step S213, black reference data for calibration correction data is acquired.

When the black reference data of the calibration correction data is acquired, the black reference region on the calibration roller faces the CCD image sensor to read the black reference region by a fixed line number with the calibration roller stopped.

The black reference data pieces for the fixed line number are averaged to execute image correction to the image data generated by reading the image recorded on the sheet using the averaged data as black calibration correction data.

In step S214, the control procedure of the calibration roller described in processing in FIG. 5 is executed.

Thus, the calibration roller becomes the state in which the region other than the white reference region faces the CCD image sensor, so that it is possible to convey the sheet to read the image recorded on the sheet directly after executing the control procedure for acquiring the calibration correction data.

In step S215, it is understood that a problem such as a breakdown of the stepping motor 403 and a signal detection defect of the HP sensor 402 occurs, and even if the stepping motor 403 is driven, the calibration roller cannot be rotated. Thus, the image processing apparatus is notified that the scanner unit is in an abnormal state.

According to the above described exemplary embodiment, when the recording medium is conveyed, the calibration roller is not brought into contact with the recording medium, so that adhesion of a stain to the white reference region can be prevented. Further, both the white reference region and the document conveyance path can be located in the in-focus position of the image sensor. Thus, sufficient calibration correction effect can be obtained.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-232625 filed Oct. 15, 2010, which is hereby incorporated by reference herein in its entirety.

What is claimed is:
1. An image reading apparatus comprising:
a conveyance member configured to convey a sheet;
a reading unit configured to read an image on the sheet conveyed by the conveyance member;
a calibration member including a white reference region for calibrating reading with the reading unit; and
a driving unit configured to move the calibration member to switch between a first state and a second state, wherein in the first state, the white reference region locates at a reading position of the reading unit when the reading unit reads the white reference region while the sheet does not exist at the reading position, and in the second state, the white reference member does not locate at the reading position and does not contact with the sheet when the sheet is conveyed for reading of the image by the reading unit, wherein the calibration member is rotatably supported and does not have a function to convey the sheet, and the driving unit rotates the calibration member to switch between the first state and a second state.

2. The image reading apparatus according to claim 1, wherein a distance from a rotation center of the calibration member to the white reference region thereon is larger than a distance from the rotation center of the calibration member to a region other than the white reference region.

3. The image reading apparatus according to claim 1, wherein the calibration member includes a black reference region for reading the image by the reading unit.

4. The image reading apparatus according to claim 3, wherein the white reference region is read by the reading unit while the calibration member is rotated by the driving unit.

5. The image reading apparatus according to claim 3, wherein the calibration member has a roller shape having an outer circumference surface of black, and the white reference region is formed on a part of the outer circumference surface thereof.

6. The image reading apparatus according to claim 5, wherein a distance from a rotation center of the calibration member to the white reference region thereon is larger than a distance from the rotation center of the calibration member to the black reference region of the outer circumference surface.

* * * * *